United States Patent
Aldana Lopez et al.

(10) Patent No.: US 10,768,623 B2
(45) Date of Patent: Sep. 8, 2020

(54) DRONE PATH PLANNING

(71) Applicant: Intel Corporation, Santa Clara, CA (US)

(72) Inventors: Rodrigo Aldana Lopez, Zapopan (MX); Leobardo Campos Macias, Guadalajara (MX); David Gomez Gutierrez, Tlaquepaque (MX); Jose Parra Vilchis, Guadalajara (MX); Rafael De La Guardia Gonzalez, Guadalajara (MX)

(73) Assignee: Intel Corporation, Santa Clara, CA (US)

( * ) Notice: Subject to any disclaimer, the term of this patent is extended or adjusted under 35 U.S.C. 154(b) by 326 days.

(21) Appl. No.: 15/851,273

(22) Filed: Dec. 21, 2017

(65) Prior Publication Data

US 2019/0196467 A1  Jun. 27, 2019

(51) Int. Cl.
| | |
|---|---|
| G05D 1/02 | (2020.01) |
| H04N 7/18 | (2006.01) |
| G06T 7/70 | (2017.01) |
| G01C 21/34 | (2006.01) |
| G08G 5/00 | (2006.01) |
| G05D 1/00 | (2006.01) |
| B64C 39/02 | (2006.01) |
| G06K 9/00 | (2006.01) |
| G08G 5/04 | (2006.01) |

(52) U.S. Cl.
CPC ......... *G05D 1/0088* (2013.01); *B64C 39/024* (2013.01); *G05D 1/0202* (2013.01); *G06K 9/0063* (2013.01); *G08G 5/0021* (2013.01); *G08G 5/0034* (2013.01); *G08G 5/0039* (2013.01); *G08G 5/0069* (2013.01); *G08G 5/045* (2013.01); *B64C 2201/141* (2013.01)

(58) Field of Classification Search
CPC ... G05D 1/00; G05D 1/02; G06T 7/70; G01C 21/34; H04N 7/18; A47L 5/30; G08G 5/00
See application file for complete search history.

(56) References Cited

U.S. PATENT DOCUMENTS

| | | | |
|---|---|---|---|
| 2012/0083963 A1* | 4/2012 | Sato ..................... | G05D 1/0259 701/25 |
| 2015/0066248 A1* | 3/2015 | Arbeit .................... | G01C 21/20 701/2 |
| 2016/0307447 A1* | 10/2016 | Johnson .................. | B60L 58/12 |

(Continued)

*Primary Examiner* — Yuri-Kan P. E.
(74) *Attorney, Agent, or Firm* — Schwegman Lundberg & Woessner, P.A.

(57) ABSTRACT

Various systems and methods for drone path planning are described herein. A system for drone path planning for a drone, the system to perform the operations: storing a current location of the drone as a current waypoint in a set of waypoints, the set of waypoints to include the current waypoint and a previous waypoint; detecting a current set of frontiers from the current location; storing the current set of frontiers in a list of active goals, the current set of frontiers associated with the current location; determining whether a target is discovered in the current set of frontiers; exploring the current set of frontiers to attempt to find the target; and exploring a previous set of frontiers from the list of active goals, when exploring the current set of frontiers does not, discover the target, the previous set of frontiers associated with the previous waypoint.

25 Claims, 7 Drawing Sheets

(56) References Cited

U.S. PATENT DOCUMENTS

| | | | |
|---|---|---|---|
| 2017/0332853 A1* | 11/2017 | Nam | A47L 5/30 |
| 2018/0109767 A1* | 4/2018 | Li | H04N 5/23206 |
| 2018/0156622 A1* | 6/2018 | Mouthaan | G01C 21/3407 |
| 2018/0189971 A1* | 7/2018 | Hildreth | H04N 5/232 |
| 2019/0049987 A1* | 2/2019 | Djuric | G05D 1/0251 |

* cited by examiner

DRONE PATH PLANNING

TECHNICAL FIELD

Embodiments described herein generally relate to autonomous robots, and in particular, to systems and methods for drone path planning.

BACKGROUND

Autonomous robots, which may also be referred to or include drones, unmanned aerial vehicles, and the like, are vehicles that operate partially or fully without human direction. Navigation and path planning of autonomous robots is a challenge due to a number of factors. Static or dynamic obstacles may be present in an operational environment, resulting in a significant computational investment in order to navigate, create maps, or plan paths.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
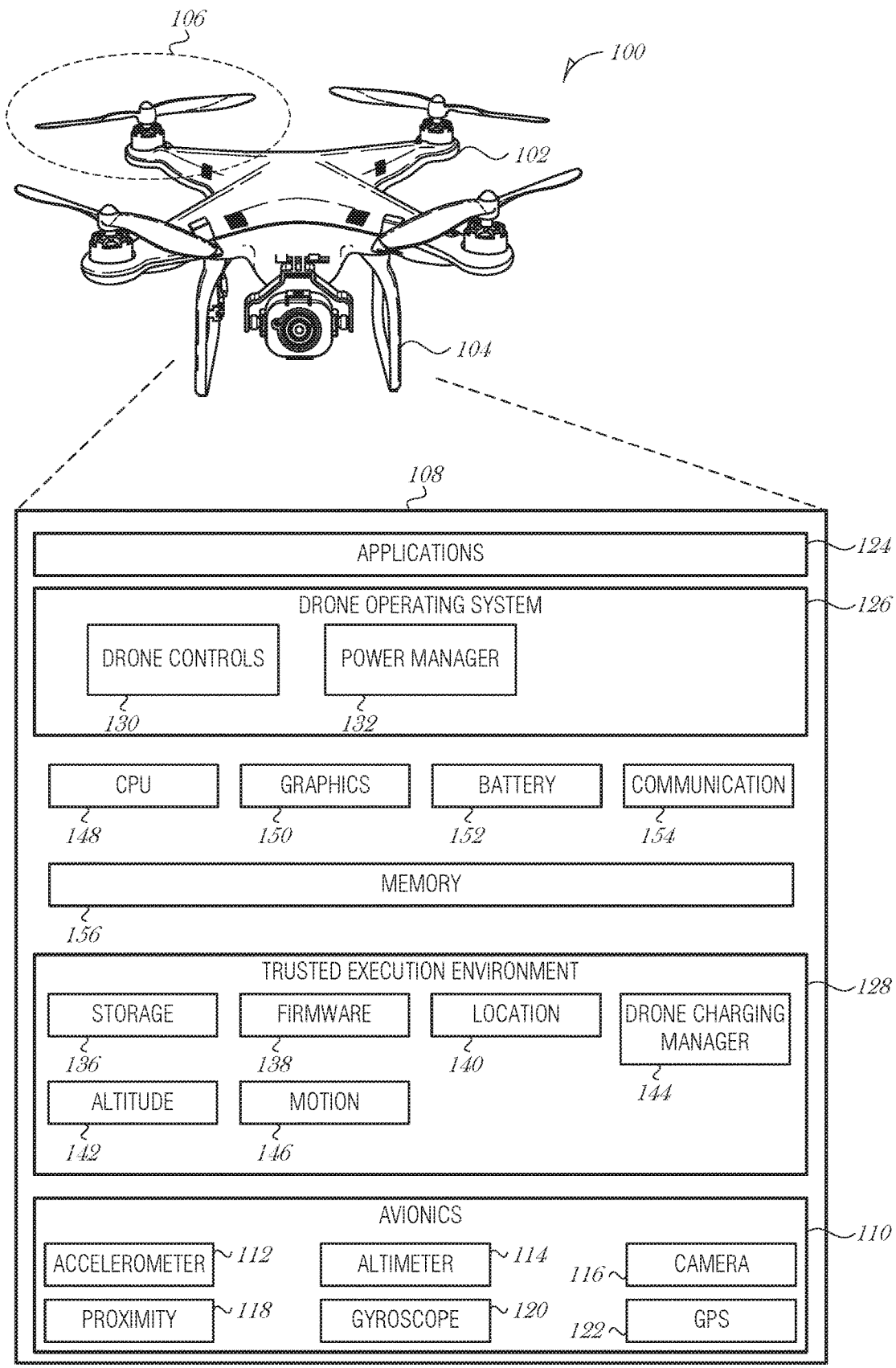
FIG. 1 is a block diagram illustrating a drone, according to an embodiment.

In the following description, for purposes of explanation, numerous specific details are set forth in order to provide a thorough understanding of some example embodiments. It will be evident, however, to one skilled in the art that the present disclosure may be practiced without these specific details.

The general problem may be defined in the context of an autonomous drone navigating in a scenario where both static and dynamic obstacles may be present. The navigation controller onboard the drone is used to compute in real-time an action that allows the drone to move towards its goal while avoiding collisions with the obstacles. Real-time computation of collision-free trajectories is a challenging problem.

One approach is to decompose the problem into a hierarchy of planners. A top level planner provides a feasible trajectory, omitting motion constraints, while a low level motion planner incorporates all relevant constraints as well as fast reactive collision avoidance to respond to unexpected events or errors in the environment model. In the present disclosure we are concerned with the top level planner.

This disclosure describes a simple online planning algorithm and method that enable drones to autonomously navigate out of complex situations without the need of a map. Examples where this capability is useful include follow-me drones in cluttered environments, exploration in search and rescue situations, etc.

The problem has some similarity with the exploration problem, which involves autonomous mapping of unknown, static environments. Simultaneous Localization and Mapping (SLAM) algorithms address the problem of localizing a mobile robot while incrementally building a consistent map in an unknown environment. It is mainly composed of a front end and back end. In the front end, an estimate of the robot position and orientation is generated based on the incremental motion constraints and sensor information. In the back end, an optimization algorithm is used to recover the trajectory and the map.

Another related problem is autonomous exploration. Solutions to this problem typically include two parts: (1) the definition of regions (frontiers) that, when visited, spatially extend the current environment model, and (2) autonomous navigation to those regions, including mapping, localization, planning, and control.

However, existing solutions for SLAM and exploration, while capable of generating safe paths for navigation, are too costly in terms of computation and memory requirements. There is currently no known solution that may be integrated in the collision avoidance loop of a commercial or professional drone.

In contrast, the presently described mechanisms have the advantage of being able to be embedded in the navigation controller of drones, enabling more robust following of targets for video capture and other applications. The approach supplements and simplifies collision avoidance solutions by helping the drone to recover the target after performing an evasive maneuver. It also provides a path planning solution in cases where a map is not available.

Additionally, the presently described mechanism has the advantage of guaranteeing the complete exploration of a closed environment. It enables collision-free navigation around obstacles by directing the drone towards waypoints inside the field of view of the sensor. Also, this novel mechanism is completely independent of the sensor (e.g., LIDAR, depth cameras, radars, or any sensor) that provides a special representation of the environment. Hence, it may be used both for 2D and 3D navigation. The mechanism is easily portable because it is independent of the map representation.

The drone's primary goal is to incrementally move towards frontier points aligned with the field of view of the drone while simultaneously building a map of the local environment and maintaining a list of key positions visited by the drone. The latter positions are used as waypoints to quickly backtrack in case that the frontiers lead into a trap where no further progress may be made towards the target. Therefore, the algorithm may be seen as providing a solution to explore an unknown environment which favors exploitation of obtained information to navigate as quickly as possible towards a particular region of the environment where the target is known to be located.

While the term "drone" is used within this document, it is understood that the usage applies broadly to any type of autonomous or semi-autonomous vehicle, which may include un-crewed vehicles, driverless cars, robots, unmanned aerial vehicles, or the like.

FIG. 1 is a block diagram illustrating a drone 100, according to an embodiment. The drone 100 may include an airframe 102, a landing support structure 104, a flight mechanism 106, and a control environment 108. The airframe 102 may be made of polymers, metals, etc. Other components of the drone 100 may be secured to the airframe 102.

The flight mechanism 106 may include mechanisms that propel the drone 100 through the air. For example, the flight mechanism 106 may include propellers, rotors, turbofans, turboprops, etc. The flight mechanism 106 may operably interface with avionics 110. The avionics 110 may be part of the control environment 108 (as shown in FIG. 1) or as standalone components. The avionics 110 may include an accelerometer 112, an altimeter 114, a camera 116, proximity sensors 118, gyroscopes 120, and a global positioning system (GPS) receiver 122.

The various components of the avionics 110 may be standalone components or may be part of an autopilot system or other avionics package. For example, the altimeter 114 and GPS receiver 122 may be part of an autopilot system that include one or more axes of control. For instance, the autopilot system may be a two-axis autopilot that may maintain a preset course and hold a preset altitude. The avionics 110 may be used to control in-flight orientation of the drone 100. For example, the avionics 110 may be used to control orientation of the drone 100 about pitch, bank, and yaw axes while in flight. As the drone 100 approaches a power source, the drone 100 may need to maintain a particular angle, position, or orientation in order to facilitate coupling with the power source.

In many cases, the drone 100 operates autonomously within the parameters of some general protocol. For example, the drone 100 may be directed to deliver a package to a certain residential address or a particular geo-coordinate. The drone 100 may act to achieve this directive using whatever resources it may encounter along the way.

In other cases where the drone 100 does not operate in fully autonomous mode, the camera 116 may allow an operator to pilot the drone 100. Non-autonomous, or manual flight, may be performed for a portion of the drone's operational duty cycle, while the rest of the duty cycle is performed autonomously.

The control environment 108 may also include applications 124, a drone operating system (OS) 126, and a trusted execution environment (TEE) 128. The applications 124 may include services to be provided by the drone 100. For example, the applications 124 may include a surveillance program that may utilize the camera 116 to perform aerial surveillance. The applications 124 may include a communications program that allows the drone 100 to act as a cellular repeater or a mobile Wi-Fi hotspot. Other applications may be used to operate or add additional functionality to the drone 100. Applications may allow the drone 100 to monitor vehicle traffic, survey disaster areas, deliver packages, perform land surveys, perform in light shows, or other activities including those described elsewhere in this document. In many of these operations drones are to handle maneuvering around obstacles to locate a target.

The drone OS 126 may include drone controls 130, a power management program 132, and other components. The drone controls 130 may interface with the avionics 110 to control flight of the drone 100. The drone controls 130 may optionally be a component of the avionics 110, or be located partly in the avionics 110 and partly in the drone OS 126. The power management program 132 may be used to manage battery use. For instance, the power management program 132 may be used to determine a power consumption of the drone 100 during a flight. For example, the drone 100 may need a certain amount of energy to fly to a destination and return to base. Thus, in order to complete a roundtrip mission, the drone 100 may need a certain battery capacity. As a result, the power management program 132 may cause the drone 100 to terminate a mission and return to base.

The TEE 128 may provide secured storage 136, firmware, drivers and kernel 138, a location processing program 140, an altitude management program 142, and a motion processing program 146. The components of the TEE 128 may operate in conjunction with other components of the drone 100. The altitude management program 142 may operate with the avionics 110 during flight.

The TEE 128 may provide a secure area for storage of components used to authenticate communications between drones or between a drone and a base station. For example, the TEE 128 may store SSL certificates or other security tokens. The data stored in the TEE 128 may be read-only data such that during operation the data cannot be corrupted or otherwise altered by malware or viruses.

The control environment 108 may include a central processing unit (CPU) 148, a video/graphics card 150, a battery 152, a communications interface 154, and a memory 156. The CPU 148 may be used to execute operations, such as those described herein. The video/graphics card 150 may be used to process images or video captured by the camera 116. The memory 156 may store data received by the drone 100 as well as programs and other software utilized by the drone 100. For example, the memory 156 may store instructions that, when executed by the CPU 148, cause the CPU 148 to perform operations such as those described herein.

The battery 152 may provide power to the drone 100. While FIG. 1 shows a single battery, more than one battery may be utilized with drone 100. While FIG. 1 shows various components of the drone 100, not all components shown in FIG. 1 are required. More or fewer components may be used on a drone 100 according to the design and use requirements of the drone 100.

The drone 100 may be an unmanned aerial vehicle (UAV), such as is illustrated in FIG. 1, in which case it includes one or more flight mechanisms (e.g., flight mechanism 106) and corresponding control systems (e.g., control environment 108). The drone may alternatively be a terrestrial drone, in which case it may include various wheels, tracks, legs, propellers, or other mechanisms to traverse over land. The drone may also be an aquatic drone, in which case it may use one of several types of marine propulsion mechanisms, such as a prop (propeller), jet drive, paddle wheel, whale-tail propulsion, or other type of propulsor.

Figure 2:
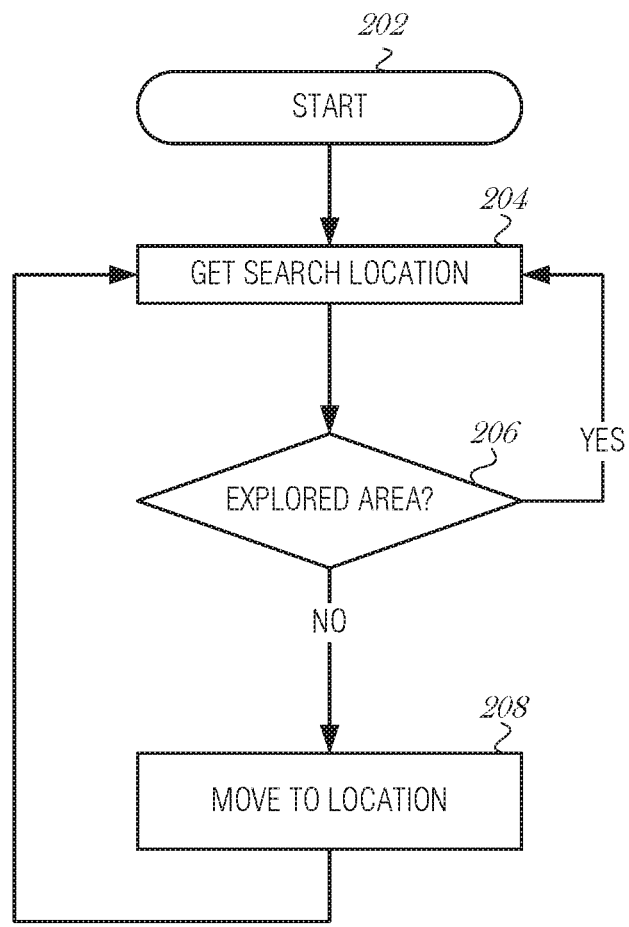
FIG. 2 is a flowchart illustrating a process for searching for an object, according to an embodiment.

FIG. 2 is a flowchart illustrating a process 200 for searching for an object, according to an embodiment. The process 200 begins (operation 202) and a candidate search location is obtained by the drone (operation 204). The candidate search location is obtained through the use of sensors on the drone or accessible to the drone (e.g., environmental sensors that the drone may use). The candidate search location is an area within sensor range that appears to be passable. For instance, a wall may have a door to a corridor. The drone may detect the wall (e.g., the wall is within sensor range), and may also detect the door in the wall. The door may be set as the candidate search location.

At operation 206, the process 200 is used to determine whether the area is explored. Continuing the example from above, if the drone has already explored the opening in the wall (e.g., an open door or portal), then the drone may move to other candidate search locations by moving back to operation 204, and searching the drone's current area for additional search locations. For instance, the drone may turn 180 degrees from its current orientation and scan the area with its sensors. It may determine that another area is available for exploration.

If the area is unexplored, then the drone moves to the candidate search location (operation 208) and scans for new locations (operation 204). For instance, continuing the example from above, the drone may move to the opening and continue scanning. The drone may detect a corridor with another open portal at the end. The open portal at the end of the corridor may be set as a new candidate search location (operation 204) and the drone may determine whether that search location is unexplored (operation 206), and if so, then move to the location to explore it (operation 208).

This set of operations may continue until the drone discovers the object that it was searching for. The object may be a location (e.g., a geopoint), a person, another drone, or other things. In a specific embodiment, the drone is set to follow a user. If the drone is obstructed from directly following the user, or if the drone loses sight of the user, or otherwise gets disoriented, the drone is able to use the process 200 to relocate the user.

FIGS. 3A-3D are diagrams that illustrate an exploration and discovery process, according to an embodiment. For convenience of discussion, the diagram in FIGS. 3A-D are assumed to be oriented such that the top of the diagram is due north, with other cardinal points of east toward the right side of the diagram, south toward the bottom of the diagram, and west toward the left side of the diagram.

Figure 3A:
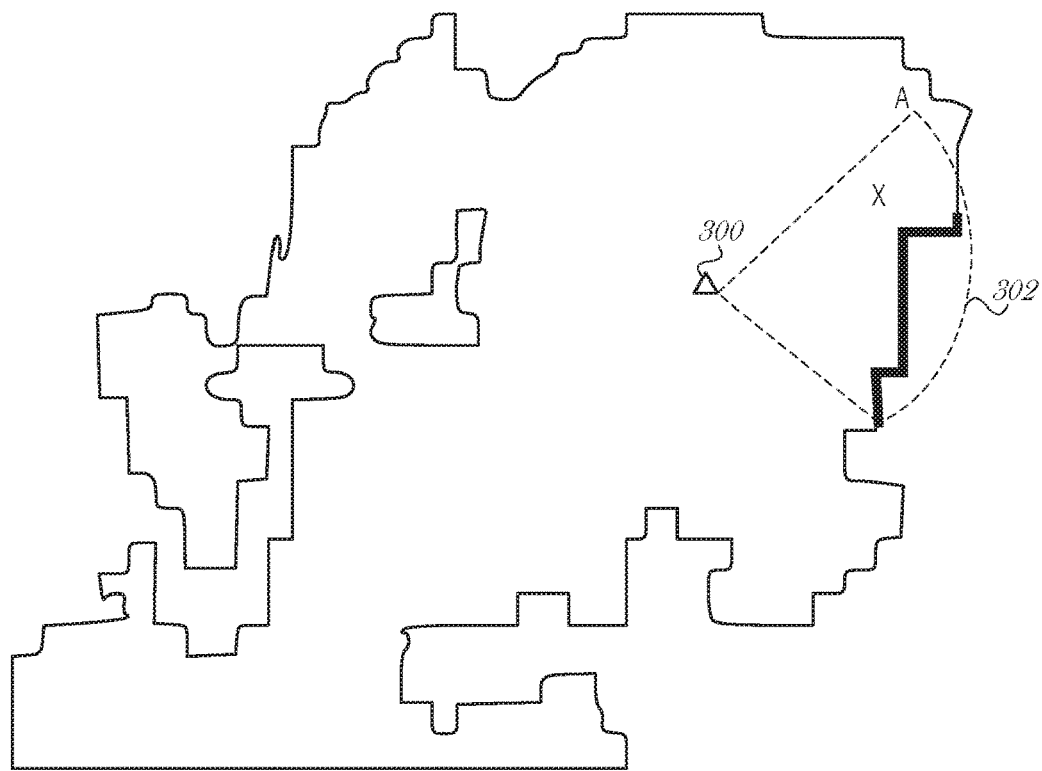
FIGS. 3A-3D are diagrams that illustrate an exploration and discovery process, according to an embodiment.

In FIG. 3A, a drone 300 is initially oriented to the right side of the diagram (e.g., east). The drone 300 is able to scan an arc 302 in the direction that the drone 300 is facing. In this example, the scan arc 302 is approximately 90 degrees. It is understood that the scan arc 302 may be more or less than 90 degrees, depending on the type, number, size, and other features of the sensor or sensors available to the drone 300. The area that the drone 300 is able to scan may be range-limited due to the type, power, model, or other features of the sensor or sensors used to scan. In this example, the drone 300 is able to sense out to point A, and as such, cannot detect the far wall beyond point A.

The drone 300 may choose a candidate search location 'X' that is north of the wall that it is able to detect (as depicted in FIG. 3A with a bold line). Moving toward candidate location 'X', the drone 300 is able to scan further and determine that the wall extends northward. As a result, the drone 300 is able to determine that it is trapped and has to set out in a new direction to explore.

Figure 3B:
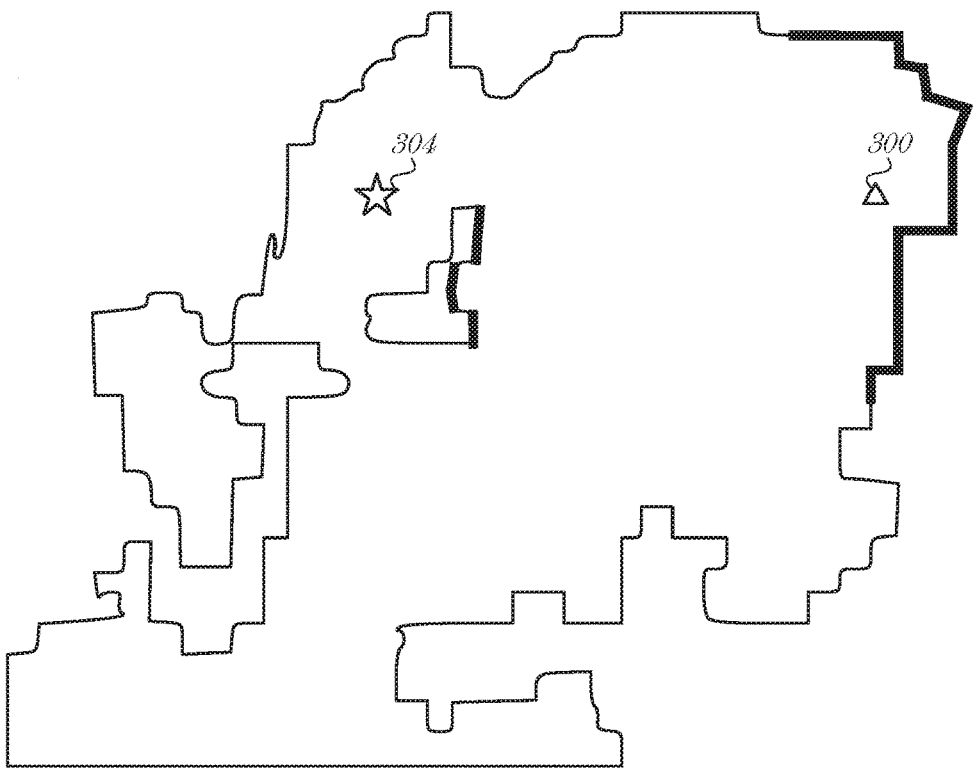
Figure 3C:
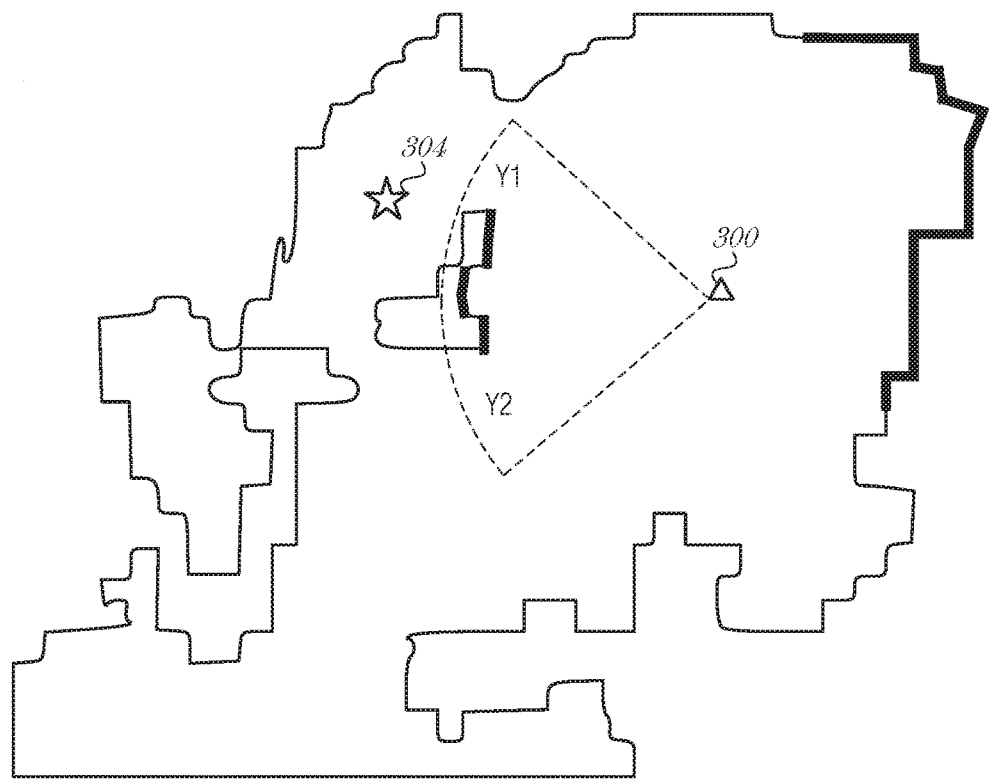

FIG. 3B illustrates the drone 300 after reaching location 'X' and having determined that it is trapped. The drone 300 determines that the immediate area has been explored. The drone 300 may return to its initial position and turn to a different direction (e.g., west), as depicted in FIG. 3C. Although the drone 300 in the example illustrated in FIG. 3C turns 180 degrees to explore in the opposite direction than its initial orientation, it is understood that the drone 300 may turn any amount when performing this operation.

The drone 300 performs a similar scan as that depicted in FIG. 3A, scanning a forward arc to determine whether there are any traversable paths. The drone 300 detects a wall portion and two openings on the north side of the wall and on the south side of the wall. The drone 300 may set candidate search locations Y1 and Y2, based on where the drone 300 did not detect any wall blocking its path. In some cases, the drone 300 may have some information about the target's location, as depicted by the star 304 in FIG. 3C. The information may be a general direction, a GPS location, a range and vector, or an angle from the drone's current orientation. Based on this information, the drone 300 may select candidate search location Y1 to investigate first.

Figure 3D:
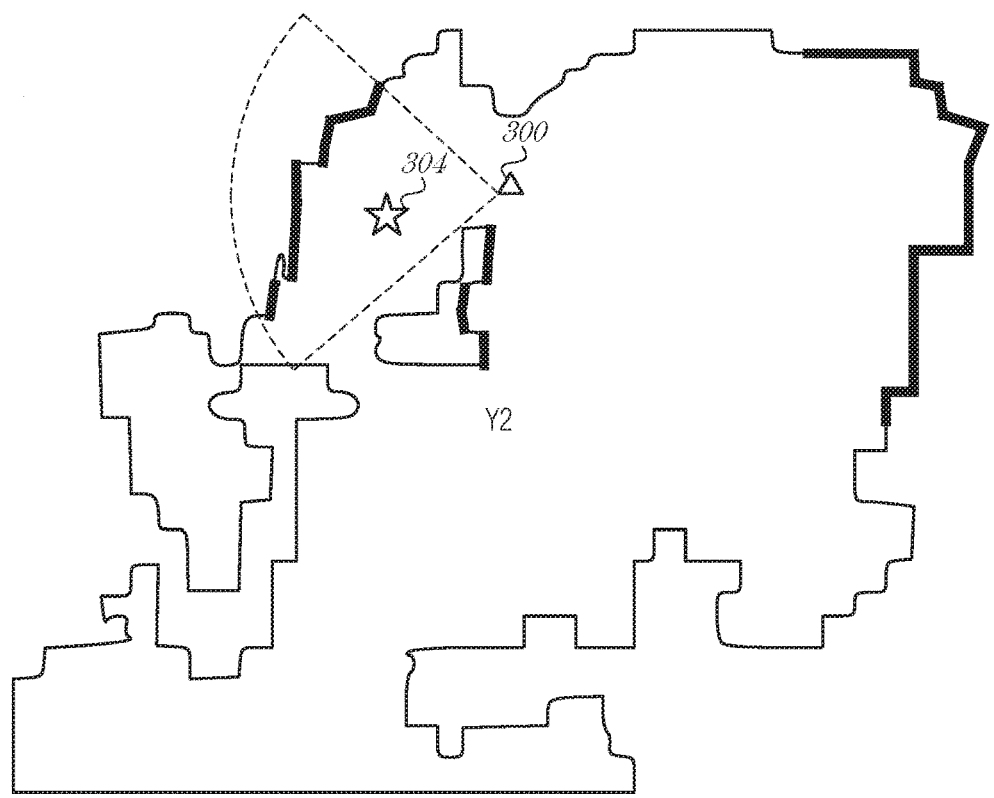

Before moving to candidate search location Y1, the drone 300 sets a waypoint at its current position. The waypoint is used if the search at location Y1 is fruitless. For instance, there may be a wall between location Y1 and the target 304 that the drone 300 is unable to sense at its current location. However, once at the search location Y1, the drone 300 would be able to detect the wall and move back to the waypoint to move to the secondary search location Y2. In this example, as shown in FIG. 3D, the drone moves to search location Y1 and scans finding the target 304.

Thus, as illustrated in FIGS. 3A-D, the drone 300 is able to construct an internal representation of the environment based on the data obtained from sensors. The drone 300 is able to move incrementally toward boundary points that takes it closer to the target 304 until it is visible in the field-of-view of the drone 300.

Figure 4:
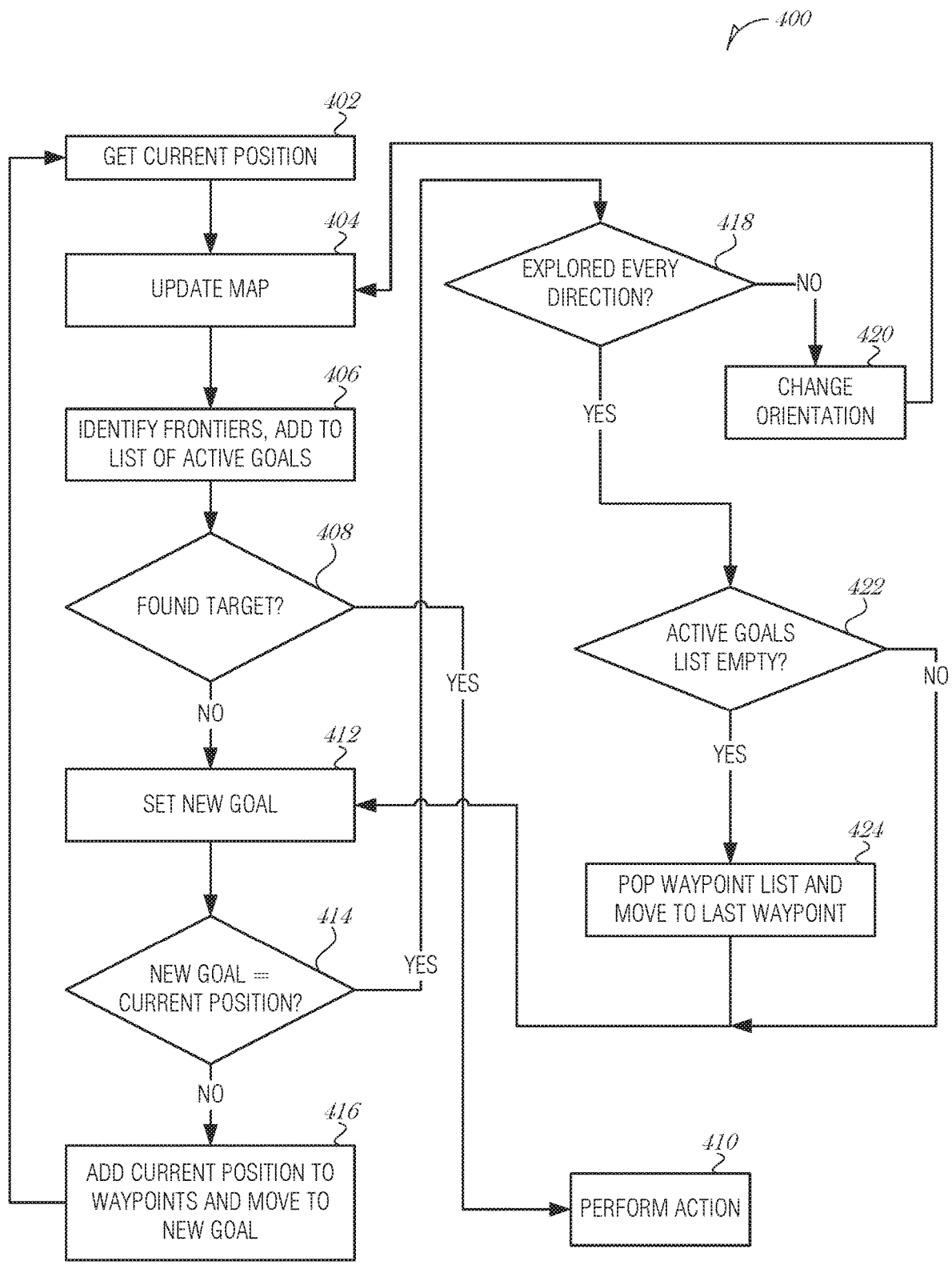
FIG. 4 is a flowchart illustrating a process for searching for a target, according to an embodiment.

FIG. 4 is a flowchart illustrating a process 400 for searching for a target, according to an embodiment. At operation 402, the drone obtains its current position and orientation. For example, the drone may use data from a GPS receiver and compass integrated into the drone.

A map is updated (operation 404) based on range sensor information to locate obstacles in front of the drone. This may be performed using LIDAR, depth cameras (e.g., RGB-D sensors), radar, or the like. Obstacles may be represented as occupied voxels in an occupancy grid map (OGM). Obstacles detected by the range sensors are dilated in the OGM in order to account for the drone's dimensions.

At operation 406, frontiers in the drone's field-of-view (FOV) are identified. Frontiers are defined as groups of voxels along the borders separating free (unoccupied) voxels from unexplored voxels in the OGM. These frontiers, or a certain point within a frontier, are added to a list of active goals. The list of active goals is used to keep track of which frontiers are available for the drone to explore.

If the drone identifies the target at this point in the process 400 (decision operation 408), then the drone is able to perform whatever actions the drone was designated to perform with respect to the target (operation 410). For instance, if the drone was programmed to follow the target (e.g., follow the user), then the drone may begin tracking the target and navigating to follow the target as it moves. As another example, if the drone was programmed to deliver a package to the target, then the drone may land, release the cargo, and return to a package delivery headquarters. Other examples are understood to be within the scope of this disclosure. If the target is not found at decision operation 410, then the process 400 continues to operation 412, where a new goal is identified.

At operation 412, a new goal is identified. The new goal may be the most promising frontier point to visit next. This was referred to as the candidate search location in the discussion above with respect to FIGS. 3A-3D. There may be more than one frontier to evaluate. In an example, the most promising frontier point is one that is in the frontier that is closest to or in the direction of the target. This most promising frontier point is removed from the list of active goals.

At decision operation 414, it is determined whether the most promising frontier point is closer to or in the direction of the target than the current position. In other words, the drone determines whether the frontier point may be a part of the pathing solution. If it is, then at operation 416, the drone's current position is added to a list of waypoints and the drone moves to the most promising frontier point. The process 400 iterates once the drone is at the most promising frontier point and evaluation is performed again.

If, on the other hand, the frontier points that are found are no closer to the target than the drone's current position, then the drone may be in one of three situations: (1) the drone has not explored in all directions around the current position; (2) the drone has not exhausted the list of promising frontier points from a previous frontier point identification operation (operation 404); (3) or the drone has completely exhausted the search area around itself and all of the frontier points from the last frontier point identification operation (operation 404).

The drone determines whether it has explored in every direction around its current position (operation 418). If the drone has not explored in every direction around its current position (e.g., 360 degrees in 2D space), then the drone may reorient itself (operation 420). The drone may change its orientation by a pre-defined angle increment, which is dependent on the angle of the drone's FOV. For example, if the drone's FOV is approximately thirty degrees, then the drone may rotate approximately thirty degrees left from the orientation of the last "identify frontiers" operation (operation 406). Some overlap may be desired to ensure complete coverage, so the drone may only rotate twenty-eight degrees, or some other amount so that the drone's FOV overlaps by some amount. After reorienting itself, the process 400 returns to operation 404 to update the map and proceed with exploration.

If the drone has explored in every direction (decision operation 418), then the drone has exhausted the search in a particular location, and the drone checks the list of active goals. If the list of active goals is empty (decision operation 422), then the drone has searched every frontier and the drone moves to the last waypoint in the waypoint list (operation 424). The process 400 then returns to operation 408 to obtain the next best promising frontier point for the waypoint from the list of active goals associated with that waypoint.

If the list of active goals is not empty at decision operation 422, then that means there are still active goals available to search from the drone's current waypoint. The process 400 returns to returns to operation 412 to obtain the next best promising frontier point for the waypoint from the list of active goals associated with that waypoint.

Figure 5:
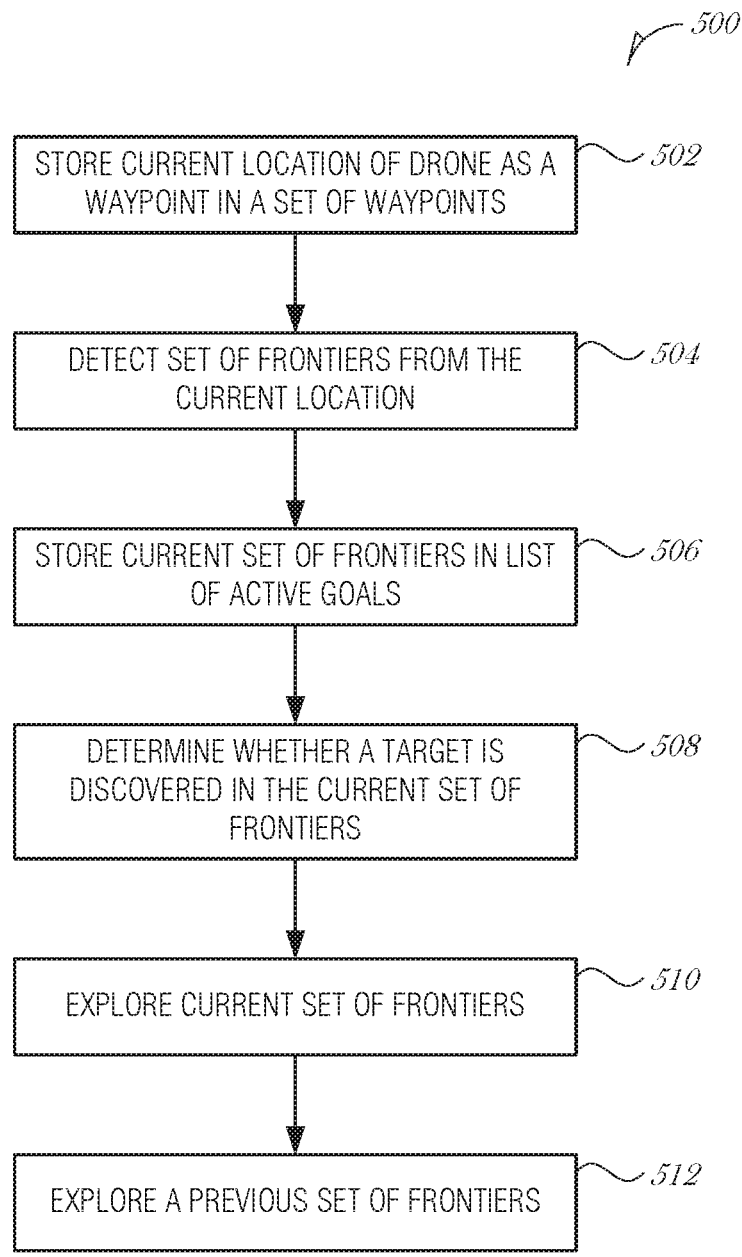
FIG. 5 is a flowchart illustrating a method for drone path planning, according to an embodiment.

FIG. 5 is a flowchart illustrating a method 500 for drone path planning for a drone, according to an embodiment. At 502, a current location of the drone is stored as a current waypoint in a set of waypoints, the set of waypoints to include the current waypoint and a previous waypoint.

At 504 a current set of frontiers is detected from the current location. In an embodiment, the current set of frontiers are regions that spatially extend an environmental model. In an embodiment, detecting the current set of frontiers comprises using a sensor to detect the current set of frontiers. In a further embodiment, the sensor comprises a light detecting and ranging sensor. In a related embodiment, the sensor comprises a depth camera.

At 506, the current set of frontiers is stored in a list of active goals, the current set of frontiers associated with the current location.

At 508, it is determined whether a target is discovered in the current set of frontiers. In an embodiment, the target is a human user. In an embodiment, the target is a geographic location. In an embodiment, determining whether the target is discovered comprises using image analysis to determine whether the target is in a field-of-view of the drone.

At 510, the current set of frontiers is explored to attempt to find the target. In an embodiment, exploring the current set of frontiers comprises iteratively exploring each frontier in the current set of frontiers.

In an embodiment, exploring the current set of frontiers comprises, from a given frontier in the current set of frontiers, storing the given frontier as a new waypoint in the set of waypoints and detecting additional frontiers from the given frontier, and iteratively processing the additional frontiers.

In an embodiment, exploring the current set of frontiers comprises maintaining the list of active goals as the frontiers in the set of frontiers are explored.

At 512, a previous set of frontiers from the list of active goals is explored, when exploring the current set of frontiers does not discover the target, the previous set of frontiers associated with the previous waypoint.

In an embodiment, exploring the previous set of frontiers comprises navigating the drone to the previous waypoint and exploring the previous set of frontiers from the previous waypoint.

In an embodiment, the method 500 includes rotating the drone to capture additional frontiers from a particular waypoint and exploring the additional frontiers.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

Figure 6:
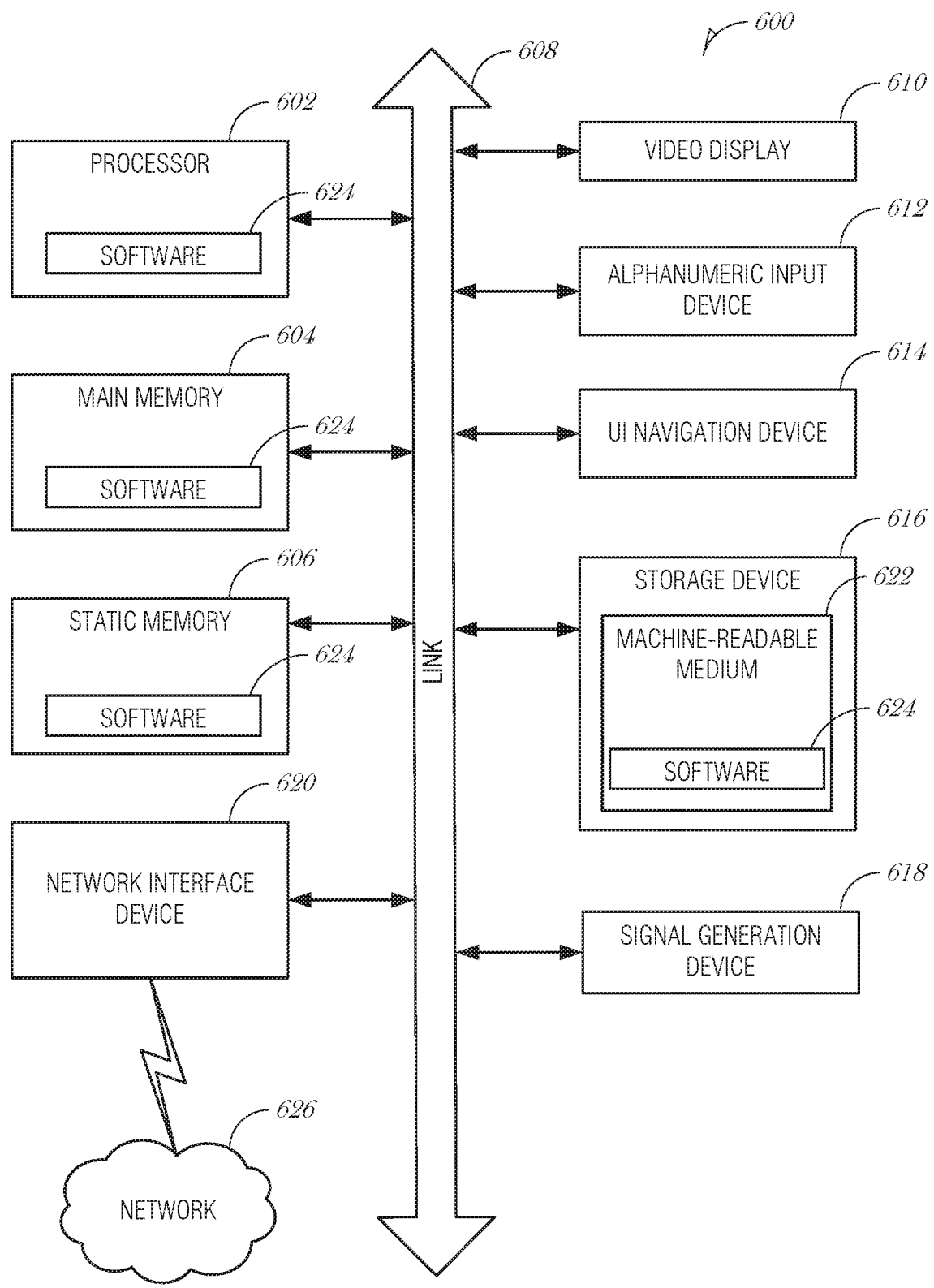
FIG. 6 is a block diagram illustrating an example machine upon which any one or more of the techniques (e.g., methodologies) discussed herein may perform, according to an embodiment.

FIG. 6 is a block diagram illustrating a machine in the example form of a computer system 600, within which a set or sequence of instructions may be executed to cause the machine to perform any one of the methodologies discussed herein, according to an embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a head-mounted display, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 600 includes at least one processor 602 (e.g., a central processing unit (CPU), a graphics processing unit (GPU) or both, processor cores, compute nodes, etc.), a main memory 604 and a static memory 606, which communicate with each other via a link 608 (e.g., bus). The computer system 600 may further include a video display unit 610, an alphanumeric input device 612 (e.g., a keyboard), and a user interface (UI) navigation device 614 (e.g., a mouse). In one embodiment, the video display unit 610, input device 612 and UI navigation device 614 are incorporated into a touch screen display. The computer system 600 may additionally include a storage device 616 (e.g., a drive unit), a signal generation device 618 (e.g., a speaker), a network interface device 620, and one or more sensors (not shown), such as a global positioning system (GPS) sensor, compass, accelerometer, gyrometer, magnetometer, or other sensor.

The storage device 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604, static memory 606, and/or within the processor 602 during execution thereof by the computer system 600, with the main memory 604, static memory 606, and the processor 602 also constituting machine-readable media.

While the machine-readable medium 622 is illustrated in an example embodiment to be a single medium, the term "machine-readable medium" may include a single medium or multiple media (e.g., a centralized or distributed database, and/or associated caches and servers) that store the one or more instructions 624. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A, 5G, DSRC, or WiMAX networks). The term "transmission medium" shall be taken to include any intangible medium that is capable of storing, encoding, or carrying instructions for execution by the machine, and includes digital or analog communications signals or other intangible medium to facilitate communication of such software.

ADDITIONAL NOTES & EXAMPLES

Example 1 is a system for drone path planning for a drone, the system comprising: a processor subsystem; and memory comprising instructions, which when executed by the processor subsystem, cause the processor subsystem to perform the operations comprising: storing a current location of the drone as a current waypoint in a set of waypoints, the set of waypoints to include the current waypoint and a previous waypoint; detecting a current set of frontiers from the current location; storing the current set of frontiers in a list of active goals, the current set, of frontiers associated with the current location; determining whether a target is discovered in the current set of frontiers; exploring the current set of frontiers to attempt to find the target; and exploring a previous set of frontiers from the list of active goals, when exploring the current set of frontiers does not discover the target, the previous set of frontiers associated with the previous waypoint.

In Example 2, the subject matter of Example 1 includes, wherein the current set of frontiers are regions that spatially extend an environmental model.

In Example 3, the subject matter of Examples 1-2 includes, wherein detecting the current set of frontiers comprises: using a sensor to detect the current set of frontiers.

In Example 4, the subject matter of Example 3 includes, wherein the sensor comprises a light detecting and ranging sensor.

In Example 5, the subject matter of Examples 3-4 includes, wherein the sensor comprises a depth camera.

In Example 6, the subject matter of Examples 1-5 includes, wherein determining whether the target is discovered comprises: using image analysis to determine whether the target is in a field-of-view of the drone.

In Example 7, the subject matter of Examples 1-6 includes, wherein exploring the current set of frontiers comprises: iteratively exploring each frontier in the current set of frontiers.

In Example 8, the subject matter of Examples 1-7 includes, wherein exploring the current set of frontiers comprises: from a given frontier in the current set of frontiers, storing the given frontier as a new waypoint in the set of waypoints and detecting additional frontiers from the given frontier, and iteratively processing the additional frontiers.

In Example 9, the subject matter of Examples 1-8 includes, wherein exploring the current set of frontiers comprises: maintaining the list of active goals as the frontiers in the set of frontiers are explored.

In Example 10, the subject matter of Examples 1-9 includes, wherein exploring the previous set of frontiers comprises: navigating the drone to the previous waypoint; and exploring the previous set of frontiers from the previous waypoint.

In Example 11, the subject matter of Examples 1-10 includes, rotating the drone to capture additional frontiers from a particular waypoint; and exploring the additional frontiers.

In Example 12, the subject matter of Examples 1-11 includes, wherein the target is a human user.

In Example 13, the subject matter of Examples 1-12 includes, wherein the target is a geographic location.

Example 14 is a method of drone path planning for a drone, the method comprising: storing a current location of the drone as a current waypoint in a set of waypoints, the set of waypoints to include the current waypoint and a previous waypoint; detecting a current set of frontiers from the current location; storing the current set of frontiers in a list of active goals, the current set of frontiers associated with the current location; determining whether a target is discovered in the current set of frontiers; exploring the current set of frontiers to attempt to find the target; and exploring a previous set of frontiers from the list of active goals, when exploring the current set of frontiers does not discover the target, the previous set of frontiers associated with the previous waypoint.

In Example 15, the subject matter of Example 14 includes, wherein the current set of frontiers are regions that spatially extend an environmental model.

In Example 16, the subject matter of Examples 14-15 includes, wherein detecting the current set of frontiers comprises: using a sensor to detect the current set of frontiers.

In Example 17, the subject matter of Example 16 includes, wherein the sensor comprises a light detecting and ranging sensor.

In Example 18, the subject matter of Examples 16-17 includes, wherein the sensor comprises a depth camera.

In Example 19, the subject matter of Examples 14-18 includes, wherein determining whether the target is discovered comprises: using image analysis to determine whether the target is in a field-of-view of the drone.

In Example 20, the subject matter of Examples 14-19 includes, wherein exploring the current set of frontiers comprises: iteratively exploring each frontier in the current set of frontiers.

In Example 21, the subject matter of Examples 14-20 includes, wherein exploring the current set of frontiers comprises: from a given frontier in the current set of frontiers, storing the given frontier as a new waypoint in the set of waypoints and detecting additional frontiers from the given frontier, and iteratively processing the additional frontiers.

In Example 22, the subject matter of Examples 14-21 includes, wherein exploring the current set of frontiers comprises: maintaining the list of active goals as the frontiers in the set of frontiers are explored.

In Example 23, the subject matter of Examples 14-22 includes, wherein exploring the previous set of frontiers comprises: navigating the drone to the previous waypoint; and exploring the previous set of frontiers from the previous waypoint.

In Example 24, the subject matter of Examples 14-23 includes, rotating the drone to capture additional frontiers from a particular waypoint; and exploring the additional frontiers.

In Example 25, the subject matter of Examples 14-24 includes, wherein the target is a human user.

In Example 26, the subject matter of Examples 14-25 includes, wherein the target is a geographic location.

Example 27 is at least one machine-readable medium including instructions, which when executed by a machine, cause the machine to perform operations of any of the methods of Examples 14-26.

Example 28 is an apparatus comprising means for performing any of the methods of Examples 14-26.

Example 29 is an apparatus for drone path planning for a drone, the apparatus comprising: means for storing a current location of the drone as a current waypoint in a set of waypoints, the set of waypoints to include the current waypoint and a previous waypoint; means for detecting a current set of frontiers from the current location; means for storing the current set of frontiers in a list of active goals, the current set of frontiers associated with the current location; means for determining whether a target is discovered in the current set of frontiers; means for exploring the current set of frontiers to attempt to find the target; and means for exploring a previous set of frontiers from the list of active goals, when exploring the current set of frontiers does not discover the target, the previous set of frontiers associated with the previous waypoint.

In Example 30, the subject matter of Example 29 includes, wherein the current set of frontiers are regions that spatially extend an environmental model.

In Example 31, the subject matter of Examples 29-30 includes, wherein the means for detecting the current set of frontiers comprise: means for using a sensor to detect the current set of frontiers.

In Example 32, the subject matter of Example 31 includes, wherein the sensor comprises a light detecting and ranging sensor.

In Example 33, the subject matter of Examples 31-32 includes, wherein the sensor comprises a depth camera.

In Example 34, the subject matter of Examples 29-33 includes, wherein the means for determining whether the target is discovered comprise: means for using image analysis to determine whether the target is in a field-of-view of the drone.

In Example 35, the subject matter of Examples 29-34 includes, wherein the means for exploring the current set of frontiers comprise: means for iteratively exploring each frontier in the current set of frontiers.

In Example 36, the subject matter of Examples 29-35 includes, wherein the means for exploring the current set of frontiers comprise: from a given frontier in the current set of frontiers, means for storing the given frontier as a new waypoint in the set of waypoints and detecting additional frontiers from the given frontier, and iteratively processing the additional frontiers.

In Example 37, the subject matter of Examples 29-36 includes, wherein the means for exploring the current set of frontiers comprise: means for maintaining the list of active goals as the frontiers in the set of frontiers are explored.

In Example 38, the subject matter of Examples 29-37 includes, wherein the means for exploring the previous set of frontiers comprise: means for navigating the drone to the previous waypoint; and means for exploring the previous set of frontiers from the previous waypoint.

In Example 39, the subject matter of Examples 29-38 includes, means for rotating the drone to capture additional frontiers from a particular waypoint; and means for exploring the additional frontiers.

In Example 40, the subject matter of Examples 29-39 includes, wherein the target is a human user.

In Example 41, the subject matter of Examples 29-40 includes, wherein the target is a geographic location.

Example 42 is at least one machine-readable medium including instructions for drone path planning for a drone, which when executed by a machine, cause the machine to perform the operations comprising: storing a current location of the drone as a current waypoint in a set of waypoints, the set of waypoints to include the current waypoint and a previous waypoint; detecting a current set of frontiers from the current location; storing the current set of frontiers in a list of active goals, the current set of frontiers associated with the current location; determining whether a target is discovered in the current set of frontiers; exploring the current set of frontiers to attempt to find the target; and exploring a previous set of frontiers from the list of active goals, when exploring the current set of frontiers does not discover the target, the previous set of frontiers associated with the previous waypoint.

In Example 43, the subject matter of Example 42 includes, wherein the current set of frontiers are regions that spatially extend an environmental model.

In Example 44, the subject matter of Examples 42-43 includes, wherein detecting the current set of frontiers comprises: using a sensor to detect the current set of frontiers.

In Example 45, the subject matter of Example 44 includes, wherein the sensor comprises a light detecting and ranging sensor.

In Example 46, the subject matter of Examples 44-45 includes, wherein the sensor comprises a depth camera.

In Example 47, the subject matter of Examples 42-46 includes, wherein determining whether the target is discovered comprises: using image analysis to determine whether the target is in a field-of-view of the drone.

In Example 48, the subject matter of Examples 42-47 includes, wherein exploring the current set of frontiers comprises: iteratively exploring each frontier in the current set of frontiers.

In Example 49, the subject matter of Examples 42-48 includes, wherein exploring the current set of frontiers comprises: from a given frontier in the current set of frontiers, storing the given frontier as a new waypoint in the set of waypoints and detecting additional frontiers from the given frontier, and iteratively processing the additional frontiers.

In Example 50, the subject matter of Examples 42-49 includes, wherein exploring the current set of frontiers comprises: maintaining the list of active goals as the frontiers in the set of frontiers are explored.

In Example 51, the subject matter of Examples 42-50 includes, wherein exploring the previous set of frontiers comprises: navigating the drone to the previous waypoint; and exploring the previous set of frontiers from the previous waypoint.

In Example 52, the subject matter of Examples 42-51 includes, rotating the drone to capture additional frontiers from a particular waypoint; and exploring the additional frontiers.

In Example 53, the subject matter of Examples 42-52 includes, wherein the target is a human user.

In Example 54, the subject matter of Examples 42-53 includes, wherein the target is a geographic location.

Example 55 is at least one machine-readable medium including instructions that, when executed by processing circuitry, cause the processing circuitry to perform operations to implement of any of Examples 1-54.

Example 56 is an apparatus comprising means to implement of any of Examples 1-54.

Example 57 is a system to implement of any of Examples 1-54.

Example 58 is a method to implement of any of Examples 1-54.

Example 55 is at least one machine-readable medium including instructions, which when executed by a machine, cause the machine to perform operations of any of the operations of Examples 1-54.

Example 56 is an apparatus comprising means for performing any of the operations of Examples 1-54.

Example 57 is a system to perform the operations of any of the Examples 1-54.

Example 58 is a method to perform the operations of any of the Examples 1-54.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc, are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for drone path planning for a drone, the system comprising:
a processor subsystem; and
memory comprising instructions, which when executed by the processor subsystem, cause the processor subsystem to perform the operations comprising:
storing a current location of the drone as a current waypoint in a set of waypoints, the set of waypoints to include the current waypoint and a previous waypoint;
detecting a current set of frontiers from the current location;
storing the current set of frontiers in a list of active goals, the current set of frontiers associated with the current location;
determining whether a target is discovered in the current set of frontiers;
exploring the current set of frontiers to attempt to find the target; and
exploring a previous set of frontiers from the list of active goals, when exploring the current set of frontiers does not discover the target, the previous set of frontiers associated with the previous waypoint.

2. The system of claim 1, wherein the current set of frontiers are regions that spatially extend an environmental model.

3. The system of claim 1, wherein detecting the current set of frontiers comprises:
using a sensor to detect the current set of frontiers.

4. The system of claim 3, wherein the sensor comprises a light detecting and ranging sensor.

5. The system of claim 3, wherein the sensor comprises a depth camera.

6. The system of claim 1, wherein determining whether the target is discovered comprises:
using image analysis to determine whether the target is in a field-of-view of the drone.

7. The system of claim 1, wherein exploring the current set of frontiers comprises:
exploring each frontier in the current set of frontiers.

8. The system of claim 1, wherein exploring the current set of frontiers comprises:
from a given frontier in the current set of frontiers, storing the given frontier as a new waypoint in the set of waypoints and detecting additional frontiers from the given frontier, and processing the additional frontiers.

9. The system of claim 1, wherein exploring the current set of frontiers comprises:
maintaining the list of active goals as the frontiers in the current set of frontiers are explored.

10. The system of claim 1, wherein exploring the previous set of frontiers comprises:
navigating the drone to the previous waypoint; and
exploring the previous set of frontiers from the previous waypoint.

11. The system of claim 1, further comprising:
rotating the drone to capture additional frontiers from a particular waypoint; and
exploring the additional frontiers.

12. The system of claim 1, wherein the target is a human user.

13. The system of claim 1, wherein the target is a geographic location.

14. At least one non-transitory machine-readable medium including instructions for drone path planning for a drone, which when executed by a machine, cause the machine to perform the operations comprising:
storing a current location of the drone as a current waypoint in a set of waypoints, the set of waypoints to include the current waypoint and a previous waypoint;
detecting a current set of frontiers from the current location;
storing the current set of frontiers in a list of active goals, the current set of frontiers associated with the current location;
determining whether a target is discovered in the current set of frontiers;
exploring the current set of frontiers to attempt to find the target; and
exploring a previous set of frontiers from the list of active goals, when exploring the current set of frontiers does not discover the target, the previous set of frontiers associated with the previous waypoint.

15. The machine-readable medium of claim 14, wherein the current set of frontiers are regions that spatially extend an environmental model.

16. The machine-readable medium of claim 14, wherein detecting the current set of frontiers comprises:
 using a sensor to detect the current set of frontiers.

17. The machine-readable medium of claim 16, wherein the sensor comprises a light detecting and ranging sensor.

18. The machine-readable medium of claim 16, wherein the sensor comprises a depth camera.

19. The machine-readable medium of claim 14, wherein determining whether the target is discovered comprises:
 using image analysis to determine whether the target is in a field-of-view of the drone.

20. The machine-readable medium of claim 14, wherein exploring the current set of frontiers comprises:
 exploring each frontier in the current set of frontiers.

21. The machine-readable medium of claim 14, wherein exploring the current set of frontiers comprises:
 from a given frontier in the current set of frontiers, storing the given frontier as a new waypoint in the set of waypoints and detecting additional frontiers from the given frontier, and processing the additional frontiers.

22. The machine-readable medium of claim 14, wherein exploring the current set of frontiers comprises:
 maintaining the list of active goals as the frontiers in the current set of frontiers are explored.

23. The machine-readable medium of claim 14, wherein exploring the previous set of frontiers comprises:
 navigating the drone to the previous waypoint; and
 exploring the previous set of frontiers from the previous waypoint.

24. A method of drone path planning for a drone, the method comprising:
 storing a current location of the drone as a current waypoint in a set of waypoints, the set of waypoints to include the current waypoint and a previous waypoint;
 detecting a current set of frontiers from the current location;
 storing the current set of frontiers in a list of active goals, the current set of frontiers associated with the current location;
 determining whether a target is discovered in the current set of frontiers;
 exploring the current set of frontiers to attempt to find the target; and
 exploring a previous set of frontiers from the list of active goals, when exploring the current set of frontiers does not discover the target, the previous set of frontiers associated with the previous waypoint.

25. The method of claim 24, wherein exploring the current set of frontiers comprises:
 from a given frontier in the current set of frontiers, storing the given frontier as a new waypoint in the set of waypoints and detecting additional frontiers from the given frontier, and processing the additional frontiers.

* * * * *